Patented Feb. 13, 1951

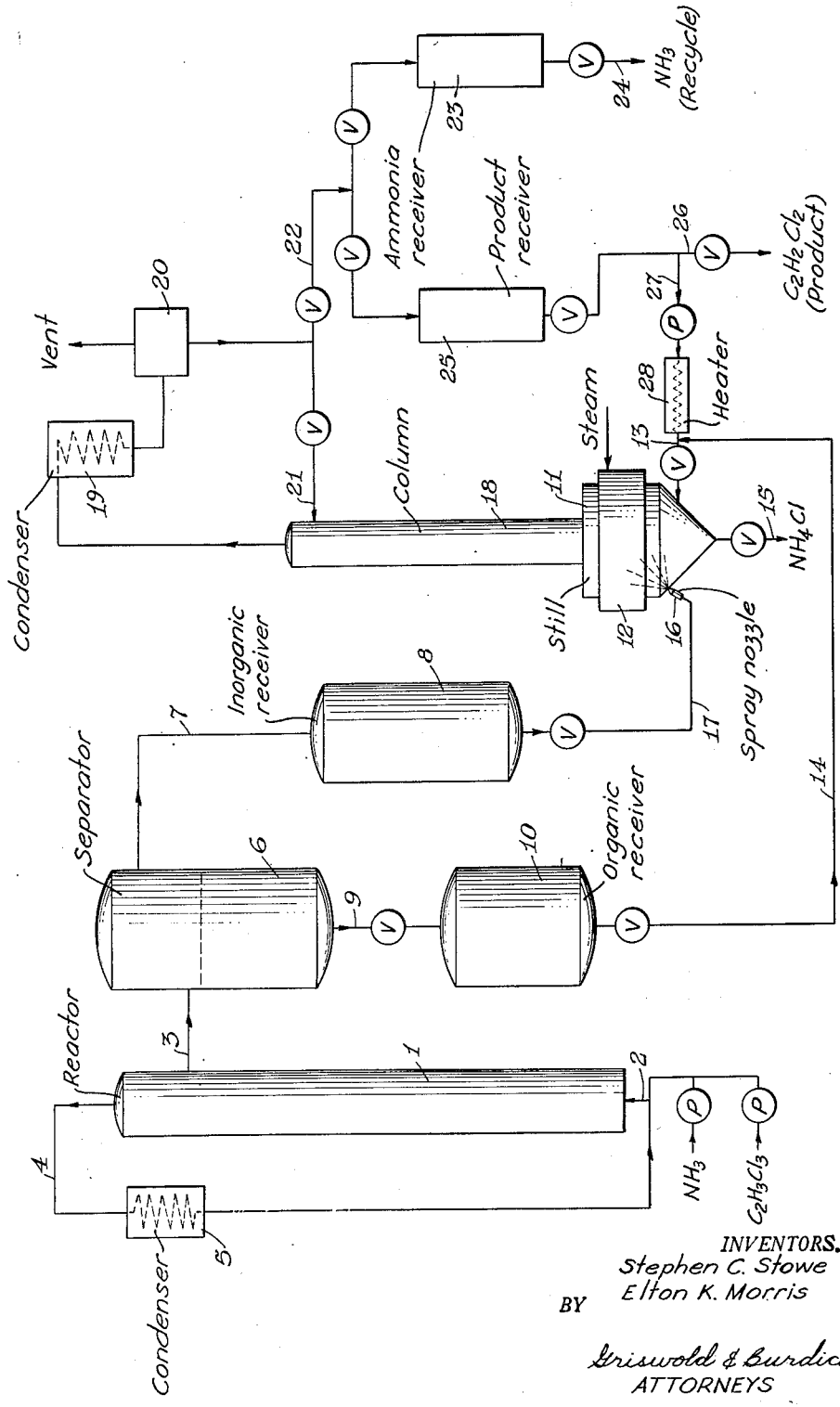

2,541,724

UNITED STATES PATENT OFFICE 2,541,724

RECOVERY OF AMMONIUM CHLORIDE FROM SOLUTION IN LIQUID AMMONIA

Stephen C. Stowe and Elton K. Morris, Midland, Mich., assignors to The Dow Chemical Company, Midland, Mich., a corporation of Delaware Application August 5, 1949, Serial No. 108,798

5 Claims. (Cl. 23—302)

This invention relates to a method of recovering ammonium chloride in crystalline form from its solutions in liquid ammonia.

In certain industrial chemical processes, such as the manufacture of vinylidene chloride by the reaction of trichloroethane with anhydrous ammonia, there is obtained as one of the products a solution of ammonium chloride in liquid ammonia. Since ammonium chloride, when pure, is valuable, it is desirable to work up this solution to separate the ammonium chloride in white crystalline form, also freeing ammonia for reuse.

The recovery of ammonium chloride from ammonia is complicated by the fact that their mixture is not a mere solution, but rather contains ammines of the type of $NH_4Cl \cdot 3NH_3$. These compounds can be decomposed by heating, but when attempt is made to recover the ammonium chloride from them in this manner, it is obtained in the form of rock-like masses which almost defy handling. There is also an equipment problem because of the extreme corrosiveness of ammonium chloride toward metals.

In view of these factors, it is a principal object of the present invention to provide a simple, effective method of separating ammonium chloride in purified crystalline form from solutions in liquid ammonia. A related object is to provide a method in which the ammonia is also recovered in usable condition without dilution. A further object is to provide a method in which corrosion difficulties are minimized.

According to the invention, ammonium chloride is separated from solution in liquid ammonia by mixing the solution into a body of a liquid inert to and immiscible with ammonium chloride and maintained at a temperature sufficiently high to flash-vaporize the ammonia from the solution. The ammonium chloride is released in fine crystalline form, the crystals being suspended in the liquid body. They may be separated by allowing them to settle or by filtration. The ammonia released in the process may be recovered by condensation.

In so far as known, the liquid body may be composed of any liquid inert to and immiscible with ammonium chloride. It is also desirable, though not essential, that the liquid be inert to, or at most slowly reactive with ammonia. In general, normally liquid hydrocarbons and halohydrocarbons are most satisfactory as the medium. Media consisting essentially of one or more aliphatic chlorohydrocarbons normally boiling below 125° C., such as carbon tetrachloride, ethylene dichloride, 1.1.2-trichloroethane, vinylidene chloride, and propylene dichloride are preferred. Chloroaromatic hydrocarbons such as chlorobenzene may also be used. Chlorohydrocarbons are easily separable from ammonium chloride, and they react with ammonia, if at all, only slowly, and then with formation of valuable substances.

The process of the invention is best carried out in a vessel provided with heating means and a condenser. Heat is supplied to maintain the liquid hot enough to flash-vaporize the ammonia as fast as the ammonia-ammonium chloride solution is added. Since the solution is usually under pressure to maintain it liquid, operating temperatures need not be very high, with 40° C. ordinarily being adequate. Higher temperatures may be used, but for atmospheric pressure operation it is well to stay considerably below the normal boiling point of the liquid medium, and ordinarily below 100° C., even with higher-boiling liquids.

In practice, the liquid medium is heated as required to maintain the operating temperature. The ammonium chloride-ammonia solution is mixed into the liquid body, preferably in such a manner as to disperse it uniformly as a fine suspension. Injection through a spray nozzle below the surface of the body is very effective. The ammonia vaporizes as the solution enters, and escapes to the condenser which may be refrigerated to liquefy the ammonia. The ammonium chloride is released as fine crystals which gradually settle to the bottom of the vessel. They may be withdrawn periodically and dried.

While the method of the invention is generally applicable, it has thus far found its greatest usefulness as a part of an industrial process for the manufacture of vinylidene chloride and ammonium chloride by the reaction of 1.1.2-trichloroethane with ammonia. The details of that reaction are described and claimed in a copending application Serial No. 79,738, filed March 5, 1949, by James L. Amos. The place of the present invention in that overall process may best be explained with reference to the accompanying drawing, which illustrates diagrammatically one arrangement of equipment for carrying it into practice.

In the apparatus shown, reaction between 1.1.2-trichloroethane and liquid ammonia takes place in a long vertical tubular pressure vessel 1 provided with a bottom inlet 2, upper side outlet 3, and top vent 4 leading to a condenser 5 from which the condensate returns to the inlet 2. The 1.1.2-trichloroethane and liquid ammonia, both at ordinary temperatures, are separately metered in the desired relative proportions and ratios into the inlet 2 by high-pressure pumps.

In general, a ratio of 3 to 6 mols of ammonia per mol of trichloroethane is most satisfactory. The entering reactants mix immediately and pass into the reactor 1 where they remain for whatever contact time is afforded by the rate of pumping, preferably 2 to 10 hours. Since heat is evolved by the reaction, ammonia tends to vaporize and escape to the condenser 5. The reaction temperature may be regulated by controlling the pressure at which this vaporization takes place, with temperatures of 0° to 100° C. being operable and 40° to 75° C. being optimal.

A stream of reacted mixture continuously overflows through the outlet 3 into a liquid-liquid separator 6 where it settles into two layers. The upper layer, of ammonium chloride dissolved in ammonia, is withdrawn through a side outlet 7 to a storage receiver 8. The lower layer, which consists essentially of vinylidene chloride together with any unreacted trichloroethane and a small proportion of dissolved ammonia, flows through a valved bottom outlet 9 to a storage receiver 10.

Purification of the vinylidene chloride reaction product and separation of ammonium chloride from the ammonia solution in storage 8 both take place by a batchwise procedure in a conventional cone-bottom still 11. This still is provided with a steam heating jacket 12, a valved bottom inlet 13 connected to the receiver 10 by a line 14, and a valved bottom outlet 15. It also has a second bottom inlet in the form of an adjustable spray nozzle 16 connected to the receiver 8 by a line 17. The still is surmounted by a fractionating column 18 provided with a condenser 19, a trap 20 for venting non-condensables, and a valved reflux return 21. From the trap 20, the condensate can also flow through a valved branch line 22 either to an ammonia receiver 23 having a drain 24, or to a product receiver 25, having a drain 26. The outlet of the receiver 25 is also connected to a pump 27 which can return product through a heater 28 to the still inlet 13.

In working up the separate reaction product layers stored in the receivers 8 and 10, crude vinylidene chloride from storage 10 is first run into the still 11 through the lines 14 and 13. It is then heated, if necessary, to a temperature of about 40° C. The ammonium chloride-ammonia solution from the receiver 8 is then injected slowly into the still through the nozzle 16. As it enters the heated body of vinylidene chloride, ammonia flash-vaporizes to the condenser, from which it runs to the receiver 23. Ammonium chloride separates out as fine crystals, which remain suspended in the crude vinylidene chloride. When addition of the ammonium chloride solution from the receiver 8 is complete, a small quantity of vinylidene chloride from a previous run may be withdrawn from the receiver 25 by the pump 27, heated in the heater 28 almost to a vaporizing temperature, and introduced into the still through the line 13. This sudden introduction of highly heated material serves to drive off any ammonia remaining unvaporized in the still 11. The crystallized ammonium chloride may then be allowed to settle into the bottom of the still and removed through the outlet 15. After drying, it is ready for use or sale.

Following this treatment, the still is operated in conventional manner to vaporize and fractionate the vinylidene chloride from the charge in the still, the fractionated material being collected as product in the receiver 25.

As a practical matter, the portions of the process equipment in contact with ammonium chloride at various stages of the process are preferably made of stainless steel to insure maximum whiteness of the recovered ammonium chloride.

*Example*

The apparatus shown in the drawing was operated continuously on a semi-plant scale at a temperature of 45° to 50° C. with 5 mols of ammonia per mol of 1.1.2-trichloroethane. Contact time in the reactor was 2.0 hours. The upper layer from the separator contained 54 per cent by weight of ammonia and 46 per cent ammonium chloride. The bottom or organic layer contained 73.6 per cent vinylidene chloride, 13.2 per cent trichloroethane, 12.9 per cent ammonia, and 0.3 per cent ammonium chloride. Vinylidene chloride of 99.7 per cent purity and white ammonium chloride crystals 98.4 per cent pure were recovered.

What is claimed is:

1. A method of recovering ammonium chloride in crystalline form from a solution thereof in liquid ammonia which comprises mixing the solution into a body of a liquid inert to and immiscible with ammonium chloride and maintained at a temperature sufficiently high to flash-vaporize the ammonia, and separating the resulting ammonium chloride crystals from the liquid body.

2. A method according to claim 1 wherein the liquid is a normally liquid aliphatic chlorohydrocarbon.

3. A process according to claim 2 wherein the chlorohydrocarbon body consists essentially of vinylidene chloride.

4. A process according to claim 2 wherein the chlorohydrocarbon body consists essentially of 1.1.2-trichloroethane.

5. In a process wherein 1.1.2-trichloroethane and a molecular excess of liquid anhydrous ammonia are caused to react at a temperature between 0° and 100° C. and the resulting product is allowed to separate into an organic layer consisting essentially of vinylidene chloride and unreacted trichloroethane and an inorganic layer consisting essentially of ammonium chloride dissolved in liquid ammonia, the method of treating the inorganic layer to recover ammonium chloride in crystalline form which comprises dispersing the inorganic layer throughout a liquid body of the organic layer maintained at a temperature sufficiently high to flash-vaporize the ammonia thus injected, and separating the resulting ammonium chloride crystals from the liquid body.

STEPHEN C. STOWE.
ELTON K. MORRIS.

No references cited.